Oct. 17, 1967 H. E. BENEKE 3,346,955
TREE AND HEDGE TRIMMER
Filed July 15, 1965 3 Sheets-Sheet 1
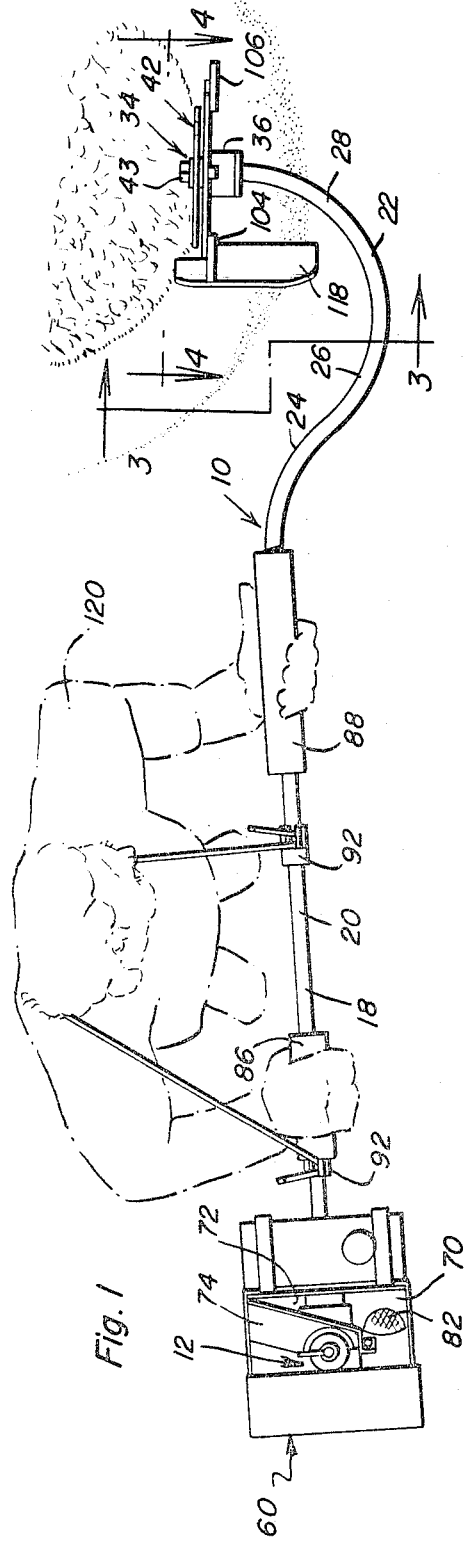
Howard E. Beneke
INVENTOR.

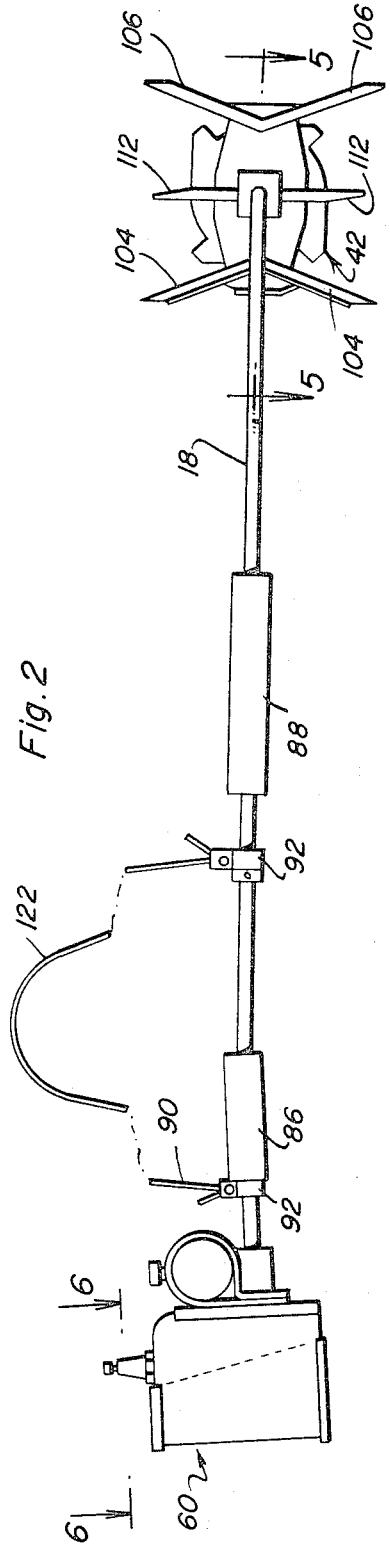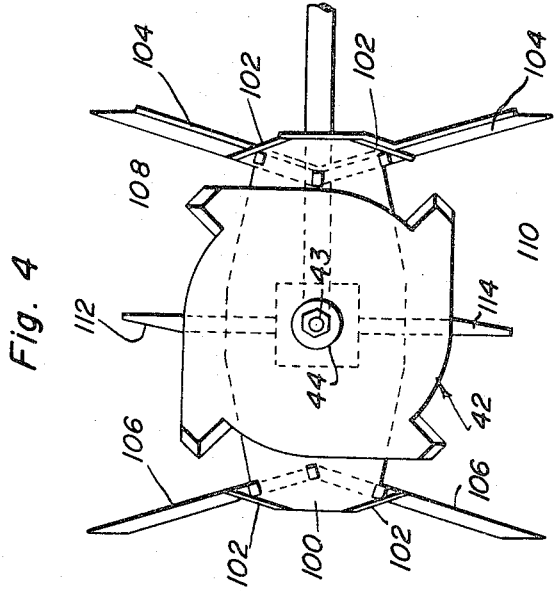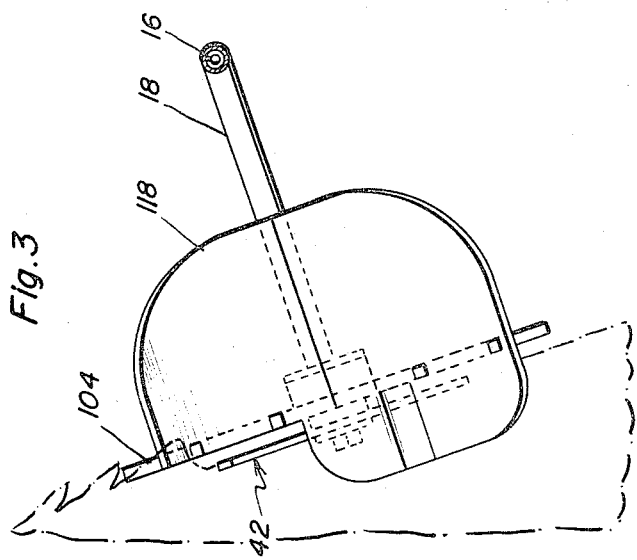
Howard E. Beneke
INVENTOR.

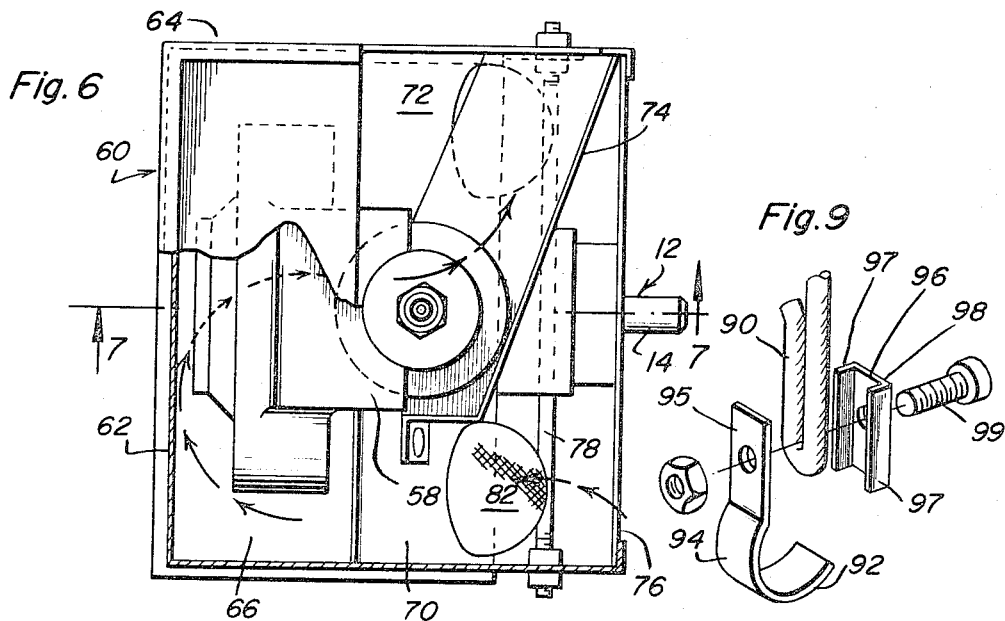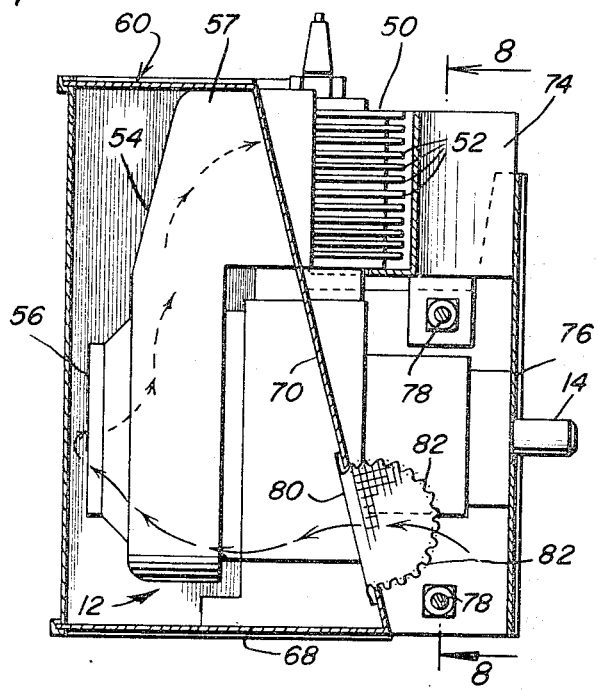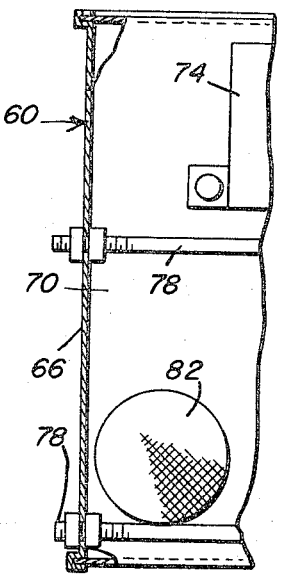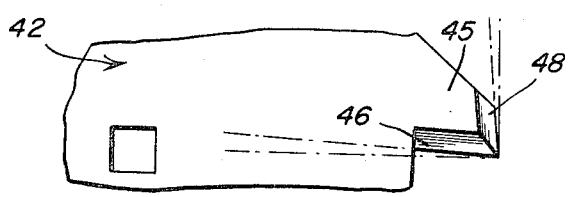

United States Patent Office 3,346,955
Patented Oct. 17, 1967

3,346,955
TREE AND HEDGE TRIMMER
Howard E. Beneke, 6988 Clifford Ave.,
Sylvan Beach, N.Y. 13157
Filed July 15, 1965, Ser. No. 472,216
5 Claims. (Cl. 30—276)

ABSTRACT OF THE DISCLOSURE

A tree trimmer in the form of an elongated wand, to one end of which is affixed a prime mover, the opposite end being bent into semi-circular form and having a head in which a disk cutter is rotatably mounted. The cutter is connected to the prime mover by a flexible shaft extending through the wand. The cutter head includes a flat plate positioned below the cutter blade and extending lengthwise of the wand. Arms are attached to the ends of the plate and extend laterally from opposite sides thereof for directing tree branches into cutting relation with the blade.

---

This invention relates to a novel and useful tree and hedge trimmer and more specifically to a portable and hand held apparatus designed primarily for the purpose of rapidly and accurately trimming trees and shrubs.

The trimmer of the instant invention includes a prime mover having a rotatable output shaft and an elongated drive shaft has one end thereof secured to the output shaft. A rotary cutter blade is journaled for rotation about an axis disposed at generally right angles to the axis of rotation of the output shaft and the other end of the drive shaft is drivingly coupled to the rotary cutter blade. The entire trimmer assembly is adapted to be utilized as an extension tool and an outer stationary casing is provided for the drive shaft and includes means defining hand grip portions spaced longitudinally therealong and on opposite sides of the center of gravity of the assembly thereby adapting the assembly to be hand held by a workman. In addition, an elongated and flexible shoulder strap is provided and has its opposite ends secured to the casing adjacent the hand grip portions.

A particularly distinctive feature of the invention is that the shoulder strap is constructed of elastic material. By this construction, and with the center portion of the shoulder strap engaging the user's shoulder and held stationary relative thereto, any angular displacement of the assembly about a horizontal axis extending transversely of the drive shaft is yieldingly resisted and therefore the shoulder strap may be utilized to yieldingly return the assembly to any predetermined desired position whereby the user of the assembly need only to deflect the free end of the assembly while trimming a tree and rely upon the resiliency of the shoulder strap to return the cutter portion of the assembly to a predetermined elevated position.

In addition, the plane of rotation of the rotary cutter blade is angularly displaced approximately twenty degrees relative to a vertical plane when the assembly is in a substantially horizontal disposed position and also slightly inclined relative to the longitudinal axis of the output shaft thereby enabling the user of the cutter to stand alongside a straight hedge or the like during the process of cutting the latter with the prime mover disposed slightly outwardly of upstanding portions of the hedge being cut.

The main object of this invention is to provide a portable cutter and trimmer constructed in a manner whereby the user of the trimmer may readily cut or trim all types of shrubbery.

Another object of this invention is to provide an assembly in accordance with the preceding object which is substantially perfectly balanced when disposed in the operative position and which includes means for yieldingly returning the assembly to a predetermined position as the rotary cutter blade of the assembly is being swung through an upstanding arc during cutting operations.

Still another object of this invention is to provide an assembly in accordance with the preceding objects and including a prime mover of the internal combustion engine type and a special enclosure for the internal combustion engine including means for filtering the cooling air of an air cooled internal combustion engine and for directing the heated cooling air of the internal combustion engine away from the operator of the assembly.

A further object of this invention is to provide an assembly in accordance with the preceding objects including guide means for the rotary cutter blade thereof that are particularly well adapted to enable the user of the assembly to selectively cut multiple leaders from the top of a tree within reach of a workman operating the assembly.

A still further object of this invention is to provide an assembly in accordance with the preceding objects and of relatively lightweight construction thereby enabling it to be readily handled by the user.

A final object of this invention to be specifically enumerated herein is to provide an assembly in accordance with the preceding objects which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the assembly of the instant invention showing the manner in which it may be utilized to trim shrubbery;

FIGURE 2 is a side elevational view of the embodiment illustrated in FIGURE 1;

FIGURE 3 is an enlarged transverse vertical sectional view taken substantially upon a plane indicated by the section line 3—3 of FIGURE 1;

FIGURE 4 is an enlarged fragmentary vertical sectional view taken substantially upon a plane indicated by the section line 4—4 of FIGURE 1;

FIGURE 5 is an enlarged fragmentary longitudinal sectional view taken substantially on the plane indicated by the section line 5—5 of FIGURE 2;

FIGURE 6 is a fragmentary plan view of the prime mover portion of the trimmer of the instant invention shown with portions of the enclosing cutter assembly therefor broken away and shown in horizontal section;

FIGURE 7 is a sectional view taken substantially upon the plane indicated by section line 7—7 of FIGURE 6;

FIGURE 8 is a fragmentary sectional view taken substantially upon a plane indicated by the section line 8—8 of FIGURE 7;

FIGURE 9 is an exploded perspective view of one of the clamp assemblies utilized to secure a shoulder harness to the handle forming casing of the trimmer; and FIGURE 10 is a fragmentary side elevational view of the rotary cutter blade of the hedge trimmer showing the manner in which the cutting edges thereof are formed.

Referring now more specifically to the drawings the numeral 10 generally resignates the tree and hedge trimmer of the instant invention. The trimmer 10 includes a prime mover in the form of an air cooled internal combustion engine generally referred to by the reference numeral 12 and it may be seen from FIGURES 6 and 7 of the drawings that the internal combustion engine 12 includes an output shaft 14. One end of a flexible drive shaft 16 is secured to the output shaft 14 and an outer casing 18 encloses all but the opposite ends of the flexible drive shaft 16. The casing 18 includes one substantially straight end portion 20 and a curved end portion 22 which curves laterally outwardly of the longitudinal center line of the end portion 20 in one direction as at 24 and then reverses its direction of curvature as at 26 to form a curved terminal end portion 28 which terminates substantially at a point intersecting a vertical plane in which the straight end portion of the casing 18 is disposed.

A mounting plate 30 is fixedly secured to the end portion 28 in any convenient manner such as by welding 32 and an arbor assembly generally referred to by the reference numeral 34 is rotatably supported from a housing sleeve 36 secured to the mounting plate 30 in any convenient manner such as by fasteners 38. The arbor assembly 34 is rotatably supported from the housing sleeve 36 by means of a bearing assembly 40 and it may be seen that a rotary cutter blade generally referred to by the reference numeral 42 is secured to the arbor assembly 34 by means of a removable stud bolt 43 and friction washer 44.

The rotary cutter blade 42 includes four circumferentially spaced tooth portions 45 and it may be seen that each tooth portion 45 includes a sharpened generally radially extending edge 46 which is inclined slightly forwardly of the direction of the desired rotation of the blade 42 at its outer end and which terminates at its outer end in a trailing cutting edge 48 which is inclined rearwardly slightly inwardly of a line tangential to a radius of the cutting blade passing through the intersection of the cutting edges 46 and 48.

The rearward inclination of the inner end of the cutting edge 46 provides a tendency for the rotary cutter blade to draw a branch against which the blade 42 is advanced inwardly toward the axis of rotation of the blade 42. The slight rearward bevel on the cutting edge 46 reducing any tendency of the blade 42 to advance too rapidly toward a large branch.

The prime mover or internal combustion engine 12 is of conventional design and includes a cylinder assembly 50 including cooling fins 52. A sheet metal air shroud 54 is mounted on one side of the engine 12 and includes a generally circular air inlet 56 which is aligned with a combination flywheel and the air impeller mounted on the end of the output shaft 14 enclosed within the shroud 54. The air impelling rotor is not illustrated but is of conventional design as is the shroud 54. The shroud 54 includes an air outlet portion 57 at its upper portion which directs the air pumped by the rotor through the shroud about the cylinder assembly 50 and between the cooling fins 52. Of course, the discharge of cooling air around the cylinder assembly 50 is normally in a direction paralleling the output shaft 14 and opposite to the direction in which the cooling air inlet 56 opens.

A sheet metal enclosure assembly generally referred to by the reference numeral 60 is provided and includes a generally U-shaped portion including a back wall 62 and a pair of opposite side walls 64 and 66. In addition, a front wall portion is provided and includes a bottom wall portion 68 and a pair of opposite side front wall sections 70 which project upwardly from opposite sides of the bottom wall 68. In addition, the enclosure assembly 60 includes a generally L-shaped air baffle 74 and it may be seen that when the enclosure 60 is fully assembled with the mounting plate 76 clamped between the free end edges of the sides 64 and 66 by means of the clamping screw 78, the entire internal combustion engine, except for the front portion of the cylinder assembly 50 is enclosed by means of the enclosure assembly 60. The side wall sections 70 and 72 are provided with inlet openings 80 for cooling air and each of the openings 80 has an air filtering screen 82 secured thereover. Accordingly, air for the blower assembly defined by the combined flywheel and rotor and the shroud 54 enters the enclosure 60 through the inlet openings 80 and then passes through the shroud inlet 56 and thereafter through the shroud 54 and outwardly of the upper portion 58 of the shroud and into the L-shaped air deflector 74.

The L-shaped air deflector 74 opens outwardly of a notched portion of the side wall 64 of the enclosure 60 and thereby directs the heated cooling air for the internal combustion engine 12 laterally of the axis of rotation of the output shaft 14.

The substantially straight end portion 20 of the housing 18 is provided with longitudinally spaced hand grip portions 86 and 88 which are spaced on opposite sides of and approximately equally of the center of gravity of the trimmer 10. In addition, an elongated, flexible and elastic shoulder strap 90 is provided and has its opposite end portions secured to the casing 18 and points adjacent the hand grip portions or members 86 and 88 by means of clamp assemblies 92. Each of the clamp assemblies 92 is of more or less conventional design and includes a partial cylindrical strap 94 including a laterally directed and apertured end portion 95. A short channel member 96 is provided and receives the end portion 95 between its generally parallel flanges 97. The bight portion 98 of the channel member 96 is apertured and a suitable fastener 99 clamps the end portion 95 to the member 96 with the corresponding end of the shoulder strap 90 received therebetween and looped about the fastener 99. Further, the clamp assemblies 92 allow free rotation of the housing 18 and the shoulder strap 90 to be adjusted in length.

A large mounting plate 100 is secured to the housing sleeve 36 by means of the fasteners 38 and generally parallels the cutting blade assembly 42. The mounting plate 100 includes upturned edge portions as at 102 for increasing the strength and rigidity of the plate 100 and two pairs of guard arms 104 and 106 are secured to the plate 100. The arms 104 and 106 on one side of the longitudinal plane of the casing 18 define a flared throat 108 therebetween while the guide arms 104 and 106 disposed on the other side of the longitudinal center line of the housing 18 form a branch receiving throat 110. The arms 106 and 104 are inclined approximately twenty degrees relative to a plane perpendicular to the plane containing the casing 18 and in addition, a pair of stop arms 112 and 114 are also secured to the plate 100 in any convenient manner and project outwardly of and divide the throats 108 and 110, respectively, into two separate portions.

From FIGURE 3 of the drawings it may be seen that the plane containing the rotary blade assembly 42 is inclined relative to the vertical when the trimmer 10 is in a substantially upright position. Further, from FIGURE 1 of the drawings it may be seen that the upstanding plane containing the rotary cutter blade 100 is inclined slightly relative to a vertical plane containing the longitudinal center line of the rear end portion 20 of the outer casing 18.

Finally, a chip guard 118 is secured to the end of the mounting plate 100 adjacent the prime mover 12 and is disposed between the rotary cutter blade assembly 42 and the operator 120. In this manner, chips dislodged by the rotary cutter blade will be prevented from flying back and injuring the operator 120.

In operation, the operator 120 supports the trimmer 10 in positions illustrated in FIGURES 1 and 2 of the drawings with the center portion 122 of the shoulder strap 90 frictionally engaged and therefore stationary relative to the operator's neck and shoulders. Thereafter, inasmuch as the trimmer is substantially balanced, the operator need only push down slightly with his right hand or pull up slightly with his left hand in order to lower the end portion of the outer casing 18 from which the rotary cutter of blade assembly 42 is journaled. Should be the operator then wish to raise the rotary blade cutter assembly 42, he may rely on the resiliency of the shoulder strap 90 to again return the trimmer 10 to the positions illustrated in FIGURES 1 and 2 of the drawings. Of course, should it be desired to raise the rotary cutter end portion of the trimmer 10 above the position illustrated in FIGURES 1 and 2 of the drawings the operator may either pull up on his left hand or push down on his right hand in order to effect such movement of the rotary cutter blade assembly 42.

A pair of headed sheet metal screws 124 are received through the plate 100 and have their heads 126 disposed between the plate 100 and the cutting blade assembly 42 to prevent the latter from contacting the plate 100 when the blade assembly 42 is laterally deflected. Further, the trimmer 10 is laterally balanced. The cutting head assembly including the arbor 34, the plate 100, and the blade assembly 42 is sufficiently laterally offset to one side of the center line of the output shaft 14 to counterbalance the weight of the curved portion 26 of the housing 18. Still further, the housing 18 is bent downwardly at the hand grip 86 to lower the center of gravity of the engine 12 relative to the longitudinal center axis of the portion of the housing 18 disposed forwardly of hand grip 86.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tree trimming tool comprising a prime mover having a rotating output shaft, a rigid tubular casing fixedly secured at one end to said prime mover, the major portion of said casing extending linear from said prime mover, the opposite end portion of said casing being bent to substantially semi-circular form, a housing fixed to the opposite end of said casing and being positioned at one side of the axis of said linear portion, a cutter arbor journalled in said housing, the axis of said arbor extending substantially perpendicular to the axis of said linear portion, a cutter blade fixed to said arbor and being formed at its periphery with circumferentially spaced apart cutting teeth, a plate fixed to said housing and being positioned intermediate said blade and said housing, said plate extending in a direction lengthwise of said linear portion of said casing and in parallel spaced relation to said cutter blade, a pair of arms fixed to each end of said plate end extending laterally from opposite sides thereof, each of said arms including inwardly from its outer end toward said cutter blade and merging with the side edge of said plate at a point spaced from the axis of said arbor comparable to the radius of said cutter blade, a chip deflecting shield fixed to the end of said plate confronting said prime mover, and a flexible shaft extending through said casing and being operatively connected at its ends to said output shaft and said arbor.

2. A tree trimmer as defined in claim 1, wherein said casing is provided with hand grips located on opposite sides of the center of gravity of the trimmer.

3. A tree trimmer as defined in claim 1, and including intermediate arms fixed to said plate and extending from opposite sides thereof diametrically of the axis of said cutter.

4. A tree trimmer as set forth in claim 1, wherein said plate is provided with projections spaced from the axis of said cutter blade and terminating in close adjacency to the under side thereof.

5. A tree trimmer as defined in claim 1, and including a flexible resilient strand having the ends thereof connected to said casing on opposite sides of the center of gravity of the trimmer, the intermediate portion of said strand being adapted to pass over the shoulders and neck of the operator.

References Cited

UNITED STATES PATENTS

| | | |
|---|---|---|
| D. 194,430 | 1/1963 | Lamb. |
| 2,445,965 | 7/1948 | Packwood _____ 123—41.65 X |
| 2,519,936 | 8/1950 | Sayre. |
| 2,697,457 | 12/1954 | Lawrence _____ 30—276 X |
| 2,827,026 | 3/1958 | Mall et al. _____ 123—41.65 X |
| 2,972,340 | 2/1961 | Bertsch _____ 123—41.65 X |
| 3,195,522 | 7/1965 | Swenson _____ 123—41.65 |

JAMES L. JONES, JR., *Primary Examiner.*